No. 846,175. PATENTED MAR. 5, 1907.
Z. XEVERS.
POULTRY FEEDER.
APPLICATION FILED OCT. 15, 1906.
2 SHEETS—SHEET 1.
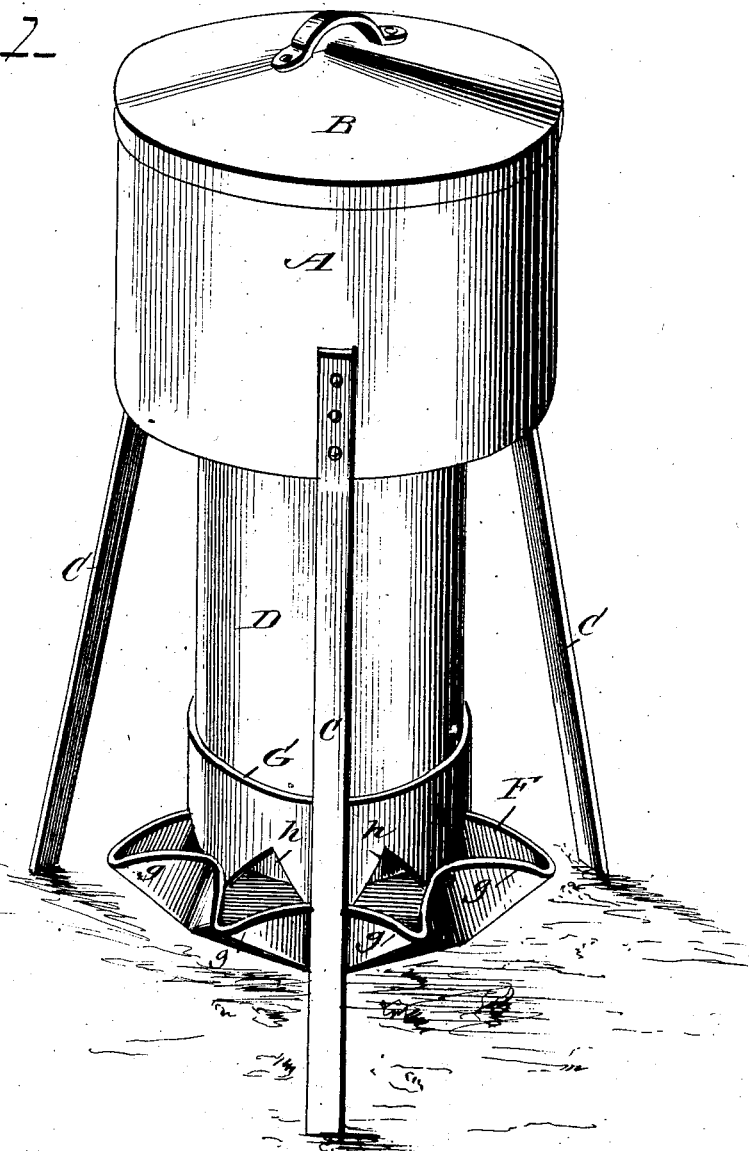
WITNESSES:
M. E. Moore
Wm. G. Brown
INVENTOR
Zachariah Xevers.
By Chas. H. Fowler
Attorney No. 846,175. PATENTED MAR. 5, 1907.
Z. XEVERS.
POULTRY FEEDER.
APPLICATION FILED OCT. 15, 1906.
2 SHEETS—SHEET 2.
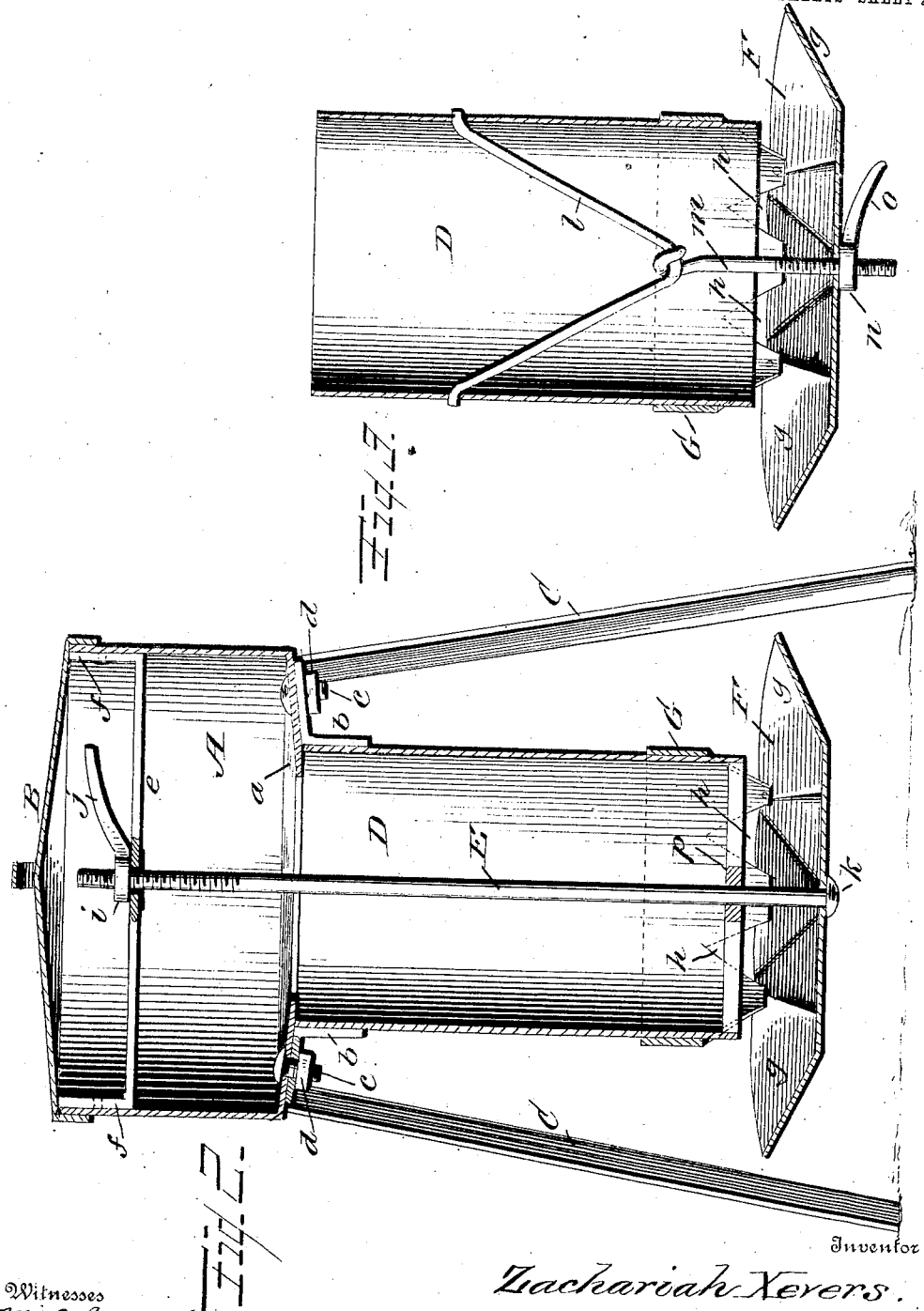
Witnesses
M. E. Moore
Wm G. Brown
Inventor
Zachariah Xevers.
By Chas. H. Fowler
Attorney

UNITED STATES PATENT OFFICE.

ZACHARIAH XEVERS, OF SANTA CRUZ, CALIFORNIA.

POULTRY-FEEDER.

No. 846,175. Specification of Letters Patent. Patented March 5, 1907.

Application filed October 15, 1906. Serial No. 339,052.

*To all whom it may concern:*

Be it known that I, ZACHARIAH XEVERS, a citizen of the United States, residing at Santa Cruz, in the county of Santa Cruz and State of California, have invented certain new and useful Improvements in Poultry-Feeders; and I do hereby declare that the following is a full, clear, and exact description of the same, reference being had to the annexed drawings, making a part of this specification, and to the letters and figures of reference marked thereon.

The present invention has reference to that class of stock-feeders adapted for feeding poultry and small stock of whatever kind through the medium of a feed-reservoir which automatically supplies the feed to a suitable trough or receptacle; and the object thereof is to provide a feeder of this character that will be simple in construction and in which the parts are readily separated and the feeder effective in its purpose.

The invention consists in a stock-feeder constructed substantially as shown in the drawings and hereinafter described and claimed.

Figure 1 of the drawings is a perspective view of my improved stock-feeder; Fig. 2, a sectional elevation thereof; Fig. 3, a sectional view when used without the specially-constructed feed-reservoir.

In the accompanying drawings, A represents the feed-reservoir, which may be of any suitable construction, form, and size adapted for containing the feed—such as all kind of grain, either whole or crushed and either dry or moist or mashed or soft food—as found desirable.

The hopper or reservoir A is provided with a suitable cover B, and said reservoir or hopper is provided with standards C suitably connected thereto and is provided with a circumferential flange $a$, extending inwardly and slightly on an incline for attaching the supply-conduit D thereto through the medium of the brackets $b$ on the conduit and the bolts $c$ and nuts $d$ or by any other means found best adapted to the purpose that will admit of the reservoir or hopper and the supply-conduit being detached and separated from each other.

The feed reservoir or hopper A has a suitable brace $e$ extending diametrically across the same and has upturned flanges $f$ for attaching to the inner side of the feed reservoir or hopper.

The rod E supports a trough F, said trough being composed of sheet metal or other preferred material and so constructed as to present a plurality of projecting spouts $g$ for obtaining access to the interior of the trough. Suitably connected to the trough F is a guide-sleeve G, having a plurality of openings or cut-away portions, as indicated at $h$, in number to correspond with the number of spouts $g$ and are disposed directly opposite the same, so as to allow access to the feed in the trough by the poultry or small stock.

The central brace or supporting rod E has a head $k$ at its lower end to support the trough F and is screw-threaded at its upper end, which extends through the brace $e$ and has engaging with the screw-threaded end of the rod a nut $i$, with hand-lever $j$, whereby the feed-trough may be raised or lowered to regulate the supply of feed to the trough in any desired quantity, the vertical adjustment of the feed-trough increasing or diminishing the space between the lower edge of the conduit D and the bottom of the trough, and consequently governing the quantity of feed supplied thereto.

In place of the specially-constructed reservoir or hopper A, as hereinbefore described, the device may be placed upon the market without the same, and in such case provision is made for the adjustability of the feed-trough from the bottom thereof. The means preferably used resides in the hanger $l$, suitably connected to the side wall of the conduit D, and a hooked screw-rod $m$, engaging the hanger and extending down through the bottom of the trough F, and a similar nut $n$, with lever $o$, is provided, as shown in Fig. 3 of the drawings, whereby the feed-trough may be raised or lowered for the purpose hereinbefore described.

In order to more effectually steady the regulating-rod E, a cross-bar $p$ is secured to the lower end of the conduit D, through which said rod passes, as shown in Fig. 2 of th drawings.

In describing the several details of construction many changes or modifications may be made therein without departing from the essential features of the invention.

Having now fully described my invention, what I claim as new, and desire to secure by Letters Patent, is—

1. A poultry-feeder, comprising a stationary conduit, a feed-trough having a plurality of outwardly-projecting spouts, a guide-sleeve encircling the lower end of the conduit and secured to the trough and having a plurality of cut-away portions or openings disposed opposite the spouts, and means for vertically adjusting the trough with relation to the conduit, substantially as and for the purpose set forth.

2. A poultry-feeder, comprising a stationary conduit, a feed-trough having a plurality of spouts, a guide-sleeve secured to the trough and having openings or cut away portions disposed opposite the spouts, and means for vertically adjusting the trough with relation to the conduit, consisting of a hanger depending from the conduit, a screw-rod engaging the hanger and extending through the trough, and a regulating-nut engaging said rod, substantially as and for the purpose described.

In testimony whereof I affix my signature in presence of two witnesses.

ZACHARIAH XEVERS.

Witnesses:
  E. W. LEONARD,
  C. H. ARCAN.